UNITED STATES PATENT OFFICE.

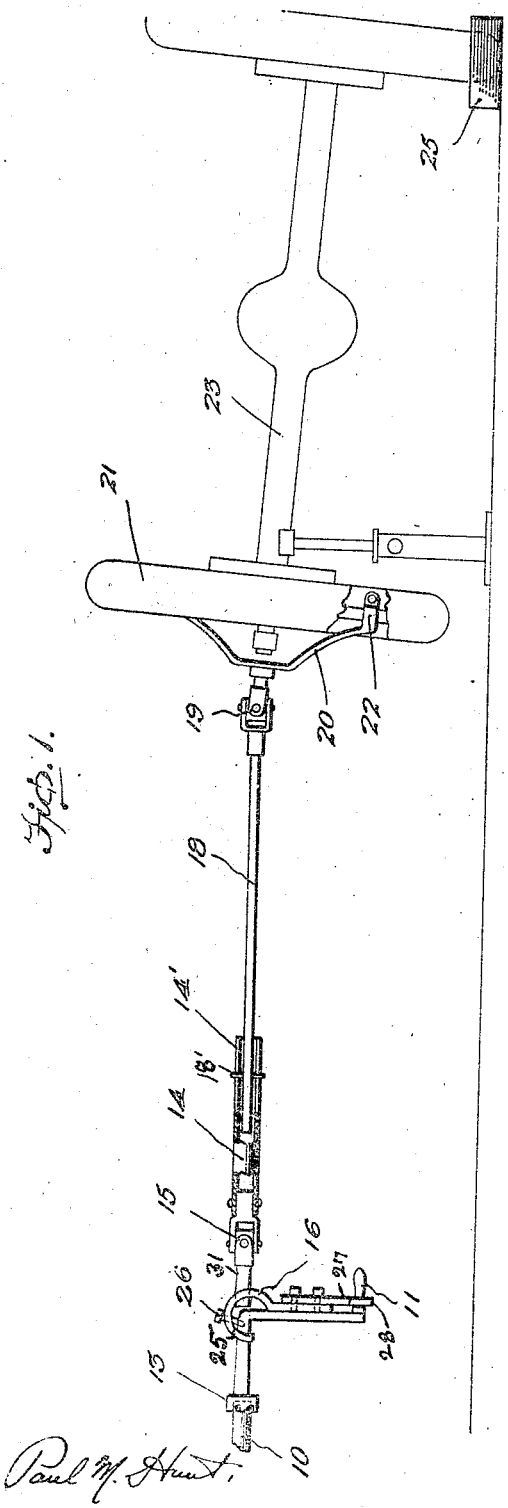
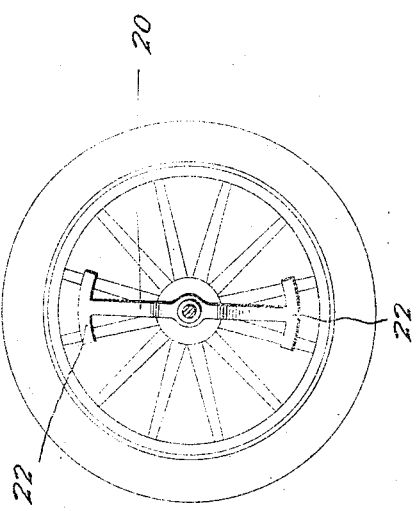
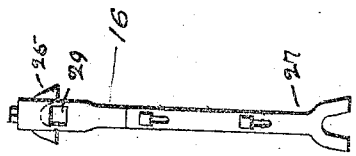

JOHN OTTO Q. JOHNSON, OF MODESTO, CALIFORNIA.

MOTOR-STARTING DEVICE.

1,422,063.                    Specification of Letters Patent.        Patented July 4, 1922.

Application filed July 9, 1921. Serial No. 483,487.

*To all whom it may concern:*

Be it known that I, JOHN OTTO Q. JOHNSON, a citizen of the United States, residing at Modesto, in the county of Stanislaus and State of California, have invented new and useful Improvements in Motor-Starting Devices, of which the following is a specification.

This invention relates to a motor starting device, and the object is to provide means whereby the motor of an automobile truck may be started by applying power from the crank shaft of another motor vehicle.

Another object is to provide means whereby a motor which fails to start, or which is difficult to start, by the usual manual cranking operation, may be started by introducing a flexible connection between one of the rear wheels of another car and the crank shaft of the car to be started.

A still further object is to provide a shaft comprising a plurality of elements longitudinally movable with reference to each other and connected by a universal joint with the usual starting crank of the vehicle to be started, and also connected by a universal joint with one of the rear wheels of a motor car to be used for applying power for starting purposes.

With the foregoing and other objects in view, the invention consists in the novel construction, combination and arrangement of elements, and in the novel manner of applying power to the crank shaft of a motor, as hereinafter more fully described and claimed.

In the drawings, Figure 1 is a view of the device in operative position, the view being chiefly in side elevation, Figure 2 is a face view of the device applied to the driven wheel, and designed to impart rotation to the starting crank of another machine, Figure 3 is a detail view in elevation of the clamping element to be applied directly to the crank of the car to be started.

The crank shaft of the car to be started is designated 10, the starting crank is shown at 11, and the ratchet mechanism interposed between the crank shaft of the engine and the starting element, is shown conventionally and designated 13.

A driving shaft is formed in two sections and includes the tubular element or hollow shaft 14 connected by a universal joint 15 with a clamping element 16, constructed as shown, and adapted for rigid connection with the crank of any motor car. Cooperating with the tubular shaft 14 is a shaft section 18 connected by a universal joint 19 with a device to be clamped to one of the rear wheels of a car to be used in applying power to the crank shaft of the car, tractor, or other motor driven vehicle, the motor of which cannot be started readily by the usual manual operation.

The clamping element 16 is curved as shown, in order that it may fit around the angle portion of the starting crank,—the end of the curved portion being forked at 25, for engaging the crank, and a set screw 26 acting to retain the parts in operative position. The shank portion of element 16 has bolted thereto an arm 27, slotted as shown, to permit of adjustment when fitting the device to different makes of cars. The forked end 28 permits of positive engagement with the crank handle. Element 16 is provided with a square opening 29 for receiving the shaft section 31, which is square in cross section.

The device 20, by means of which one of the rear wheels 21 of a second car is connected with the shaft member 18, is formed of a strap extending diametrically of the wheel and deflected around the hub in the manner illustrated. This strap member is of course non-rotatable with reference to the universal joint 19, and is connected with the spokes on opposite sides of the hub. The ends of the member 20 assume the form of brackets, each bracket 22 embracing two of the spokes and being clamped thereto.

The rear axle of the car to be used in applying power is designated 23, and wheel 21 is jacked up in order that this wheel may freely rotate, a block 25 being placed against the other wheel.

The engine of the car carrying the wheel 21 being started, power is applied to the crank shaft 10 of the other vehicle. Hollow shaft member 14 is provided with a longitudinal slot 14' and the shaft member 18 is provided with a pin 18', the pin entering the slot, so that the members of this two part shaft rotate together, but when the crank shaft 10 starts under power from its own motor, relative longitudinal movement will cause the elements to disengage.

Having described the invention, I claim:

1. A device for imparting movement from a rotary element to a crank, comprising a plurality of relatively adjustable elements for connection with the crank, one of said element last named including a fork and a curved member passing around the bend of the crank, and having formed therein an angular opening for receiving the end of said rotary element.

2. A device for imparting movement from a rotary element to a crank, the latter having a handle, said device comprising a plurality of relatively adjustable elements formed with engaging devices on the outer ends thereof for engagement respectively with the handle and an angular portion of the crank, one of the relatively adjustable elements having an opening therein for receiving the end of the rotary element.

In testimony whereof I affix my signature.

JOHN OTTO Q. JOHNSON.